T. B. SMITH.
AEROPLANE.
APPLICATION FILED MAY 21, 1918.
1,297,604.
Patented Mar. 18, 1919.
2 SHEETS—SHEET 1.
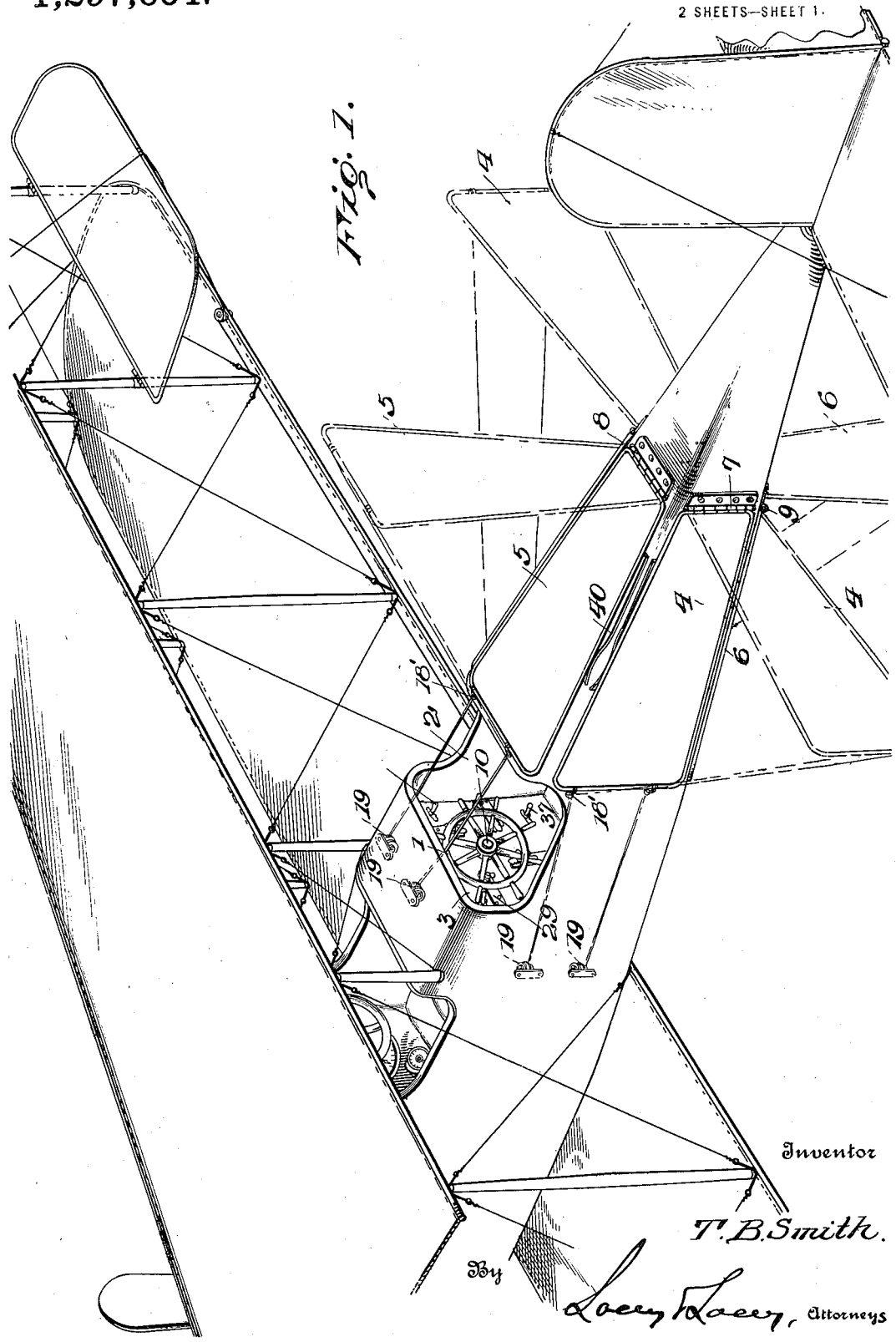
Inventor
T. B. Smith.
By Lacey & Lacey, Attorneys

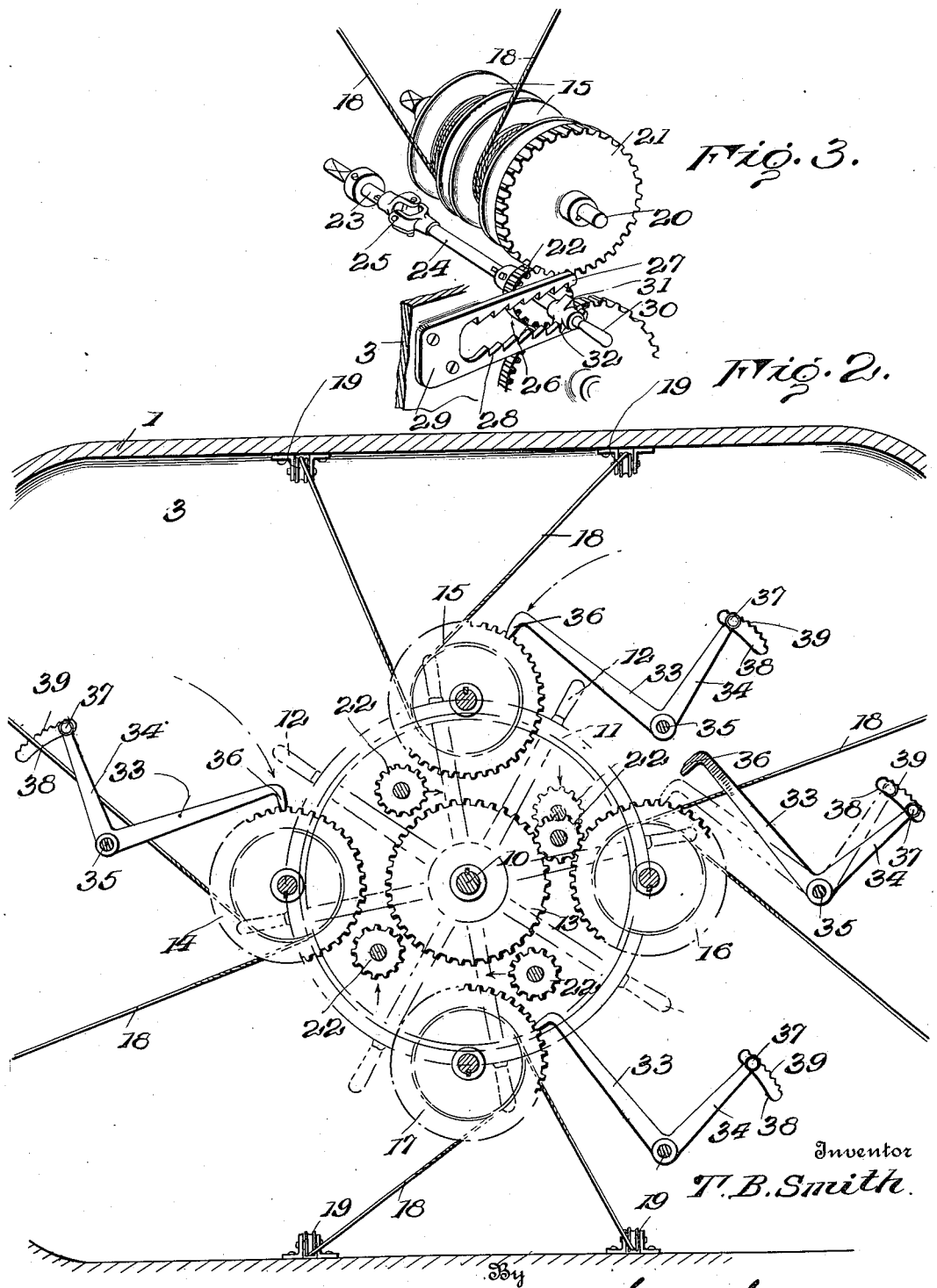

UNITED STATES PATENT OFFICE.

THOMAS B. SMITH, OF CHERITON, VIRGINIA.

AEROPLANE.

1,297,604.  Specification of Letters Patent.  Patented Mar. 18, 1919.

Application filed May 21, 1918. Serial No. 235,849.

*To all whom it may concern:*

Be it known that I, THOMAS B. SMITH, a citizen of the United States, residing at Cheriton, in the county of Northampton and State of Virginia, have invented certain new and useful Improvements in Aeroplanes, of which the following is a specification.

This invention relates to aeroplanes and has as its object the provision of means whereby the aeroplane may be more quickly maneuvered than is possible with aeroplanes of the ordinary construction. In aeroplanes, designed for use in warfare, it is particularly desirable that the aviator be enabled to quickly change the course of his flight. Heretofore it has been necessary for the aviator, in certain maneuvers, to either stop his engine or slow it down with the result that time is lost and there is likelihood of his adversary gaining an advantage. It is, therefore, one of the primary objects of the present invention to provide in connection with an aeroplane, an arrangement of wings normally folded beside the fuselage or body of the aeroplane but adapted to be extended at the will of the aviator so as to constitute, in effect, brake wings. As the means provided for controlling the movement of the brake wings is of such nature as to permit of selective extension and retraction of the wings, the aviator may, without slowing down or stopping his motor, make a sudden turn to the right or to the left or may suddenly ascend or descend.

Another object of the invention is to provide an arrangement of brake wings which will permit of the aeroplane equipped with the invention being landed within a restricted area, as for example upon the deck of a ship, without the necessity of making a spiral descent or running the risk of passing beyond the boundary lines of the landing area.

In the accompanying drawings:

Figure 1 is a perspective view of an aeroplane equipped with the device of the present invention;

Fig. 2 is a view in elevation of the mechanism provided for controlling the brake wings;

Fig. 3 is a perspective view illustrating certain portions of the gearing shown in Fig. 2.

In the drawings, the fuselage or body of the aeroplane is indicated in general by the reference numeral 1 and the same is constructed with one or more pits in which the aviator or aviators sit. In the drawings one of these pits is indicated by the numeral 2 and the front thereof is in the nature of a board 3 upon which the controlling mechanism for the brake wings is mounted. As is usual, the fuselage 1 rearwardly of the pit 2, is tapered in a rearward direction, the said fuselage having the usual opposite side walls and connecting top and bottom walls. In the illustrated embodiment of the invention there are four of the brake wings employed, two of these wings being indicated by the numeral 4, a third by the numeral 5 and the fourth by the numeral 6. The wings 4 are hingedly mounted at their rear ends as at 7 upon the opposite side walls of the fuselage rearwardly of the pit 2, and the wings 5 and 6 are hinged as indicated respectively by the numerals 8 and 9, to the upper and lower walls, respectively, of the said fuselage or body. Thus all of the wings 4, 5 and 6 are adapted to be swung outwardly to the dotted line position shown in Fig. 1 of the drawings to perform their braking function and to be swung inwardly to the full line position shown in the said figure, when it is desired that they shall be inactive.

It will, of course, be understood that the wings 4 and 5 may be of any desired dimensions and of any suitable shape and construction, the construction being such, however, that the wings will be capable of resisting the great strain imposed upon them when they are swung outwardly to braking position. It will also be understood that if the right hand one of the wings 4 is permitted to swing outwardly to the dotted line position shown in Fig. 1, the aeroplane will be caused to turn sharply toward the right, and likewise when the left hand one of the wings 4 is swung outwardly, the aeroplane will be turned sharply to the left.

Also when the wings 5 or 6 are permitted to swing outwardly to active position, the aeroplane will be caused to abruptly ascend or descend. Thus the aviator may turn abruptly in either lateral direction or upwardly or downwardly without slowing up or stopping the motor. Of course, he may operate the device embodying the invention so as to place any one or more of the wings in active position or he may permit all of the wings to swing outwardly which will, of course, greatly retard the flight of the machine and will enable the aviator to make a landing within a more or less restricted area.

The means provided for controlling the movement of the brake wings embodies a plurality of winding drums, means for selectively operating the said drums, and cables which are wound upon the drums and are connected with the individual wings. The numeral 10 indicates a shaft which is rotatably mounted in the board 3 and which at its rear end has fixed upon it a wheel 11 preferably provided with peripheral hand grips 12 whereby it may be conveniently manually rotated in either direction. Also fixed upon the shaft 10 forwardly of the board 3 is a gear 13 which is the master gear of a system provided as a means for transmitting motion from the shaft 10 to the several winding drums. The drums are indicated by the numerals 14, 15, 16 and 17, they being associated with the left hand wing 4, the top wing 5, the right hand wing 4, and the bottom wing 6, respectively. Cables 18 are preferably connected with the forward corners of each wing and are led through openings 18' in the walls of the fuselage, along the inner sides of the walls, and over pulleys 19 and to the respective drums, as clearly shown in Fig. 3 of the drawings. The drums above mentioned are each fixed upon a shaft indicated by the numeral 20 and this shaft also has fixed upon it a gear 21, the gears being arranged in spaced relation to the master gear 13 as clearly shown in Fig. 2 of the drawings, so that the gears do not mesh with one another. Idle pinions 22, however, are arranged adjacent the drums 14, 15, 16 and 17 and are designed to be selectively moved into and out of mesh with the master gear and the gears of the winding drums. In order that such movement of the idle pinions may be accomplished, a short shaft or the like indicated by the numeral 23, is fixedly mounted at a point forwardly of the board 3 and a shaft 24 is connected by a universal joint 25 with the said shaft 23 and has loosely mounted upon it the respective idle pinion above referred to. Each shaft 24 at its rear end extends through an inclined slot 26 formed in the board 3 and lying between upper and lower racks indicated respectively by the numerals 27 and 28, which racks are formed on the opposite walls of a slot in a resilient attaching plate or head 29 secured to the rear face of the board 3. A sleeve 30 is fixed upon the shaft 24 and is provided at its upper side with a tooth 31 and at its lower side with a tooth 32. The teeth 31 and 32 are designed to coact respectively with the racks 27 and 28. It will now be understood and particularly by reference to Figs. 2 and 3 of the drawings, that when it is desired, for example, to impart rotary motion to the drum 15 which is associated with the brake wing upon the top of the fuselage, the shaft 24 supporting the respective pinion 22 is moved longitudinally in the slot 26 and is in this manner brought into mesh with the master gear 13 and the gear 21 associated with said drum 15, the tooth 32 coacting with the rack 28 to hold the shaft 24 in its adjusted position. Then, of course, when the shaft 10 is rotated through the medium of the hand wheel 11, rotary motion will be transmitted from the gear 13 to the drum 15 in one direction or the other so as to wind up or pay out the corresponding cables 18.

In order to provide means for holding the drums against rotation in a direction to unwind or pay out the respective cables, there is provided in connection with each of the drums 14, 15, 16 and 17, a pawl comprising an arm 33 and an arm 34, the pawl being pivotally mounted at the juncture of the arms, as indicated by the numeral 35. At its end, the arm 33 is provided with a tooth 36 designed to coöperate with the teeth of the winding drum gears 21. The pawls are preferably mounted upon the forwardly presented or inner face of the board 3 but the outer ends of the arms 34 of the pawls are provided with handles 37 which project through arcuate slots 38 formed in the said board 3, one wall of each of these slots being preferably formed with shallow teeth or being roughened, as indicated by the numeral 39, so as to coact frictionally with the handle 37 whereby to hold the pawl in one position or another of its adjustment. In order that each brake wing may be given a slight outward movement initially to permit of air rushing into the space between the wing and the adjacent surface of the fuselage and then by its force cause the wing to swing outwardly to its full extent, bowed leaf springs 40 are secured to the walls of the fuselage and bear against the inner faces of the wings, the tendency of the springs being to force the wings in an outward direction. Assuming that all of the wings are retracted or in inactive position as shown in full lines in Fig. 1 of the drawings, the aviator may cause the extension of any one of the wings by shifting the pawl of the respective one of the winding drum gears out of engagement with the said gear, thus allowing the spring 40 for the respective wing to slightly swing the wing away from the side of the fuselage, whereupon the force of the air will cause the wing to swing to full extended position. Thus any wing may be released for immediate outward swinging movement, or all of the wings might be substantially simultaneously so released. Of course, if the operator desires to retard the outward swinging movement of the wings or does not care to have the wing swing outwardly to full extended position, he may, before moving the respective pawl to released position, bring into action the respective idle pinion 22 and then by manually controlling the rotation of the hand wheel 11, permit the cables 18 to be paid out more or less slowly. Of course, in retracting any one of the wings the hand wheel 11 is to be manually rotated and the idle pinion 22 for the respective winding drum gear 21 is to be brought into mesh with the said gear and the master gear 13.

From the foregoing description of the invention it will be readily understood that the brake wings may be selectively brought into braking position to a greater or less degree for the purpose of steering the machine in the event of damage to the ordinary steering apparatus.

It will be understood, of course, that the brake wings may be made longer than as shown in the drawings, and in fact may be proportioned in any manner found desirable.

Aside from the functions above ascribed to the brake wings it will be understood that these wings may be opened to have a parachute effect in making nose dives so as to suitably retard the descent of the aeroplane.

Having thus described the invention, what is claimed as new is:

1. The combination with a fuselage, of a plurality of brake wings hingedly mounted thereon, selectively releasable means for normally restraining said wings against outward movement, means for permitting and limiting the outward movement of the wings, a central controlling shaft, and means for selectively connecting the limiting means with said shaft to return a wing to inoperative position.

2. The combination with a fuselage, of a plurality of brake wings hingedly mounted thereon, a plurality of drums each operatively connected with one of the brake wings, means for normally holding the drums against movement, a central controlling shaft, and means for selectively connecting said shaft with the drums.

3. The combination with a fuselage, of a plurality of brake wings hingedly mounted thereon, a plurality of drums each operatively connected with one of the brake wings, means for normally holding the drums against movement, a central controlling shaft, a plurality of idlers each arranged to operatively connect the controlling shaft with one of the drums, and means for holding the idlers in their operative or inoperative positions.

4. The combination with a fuselage, of a plurality of brake wings hingedly mounted thereon, a plurality of drums each operatively connected with one of the brake wings, means for normally holding the drums against movement, a central controlling shaft, a plurality of idler shafts, each arranged adjacent one of the drums and having one end free, an idler upon each of said shafts adapted to operatively connect the adjacent drum with the central controlling shaft, and means coöperating with the free ends of the respective idler shafts to hold the same in the operative or inoperative positions.

5. The combination with a fuselage, of a plurality of brake wings hingedly mounted at their rear ends thereon, a plurality of drums mounted on the fuselage, cables wound on the respective drums and connecting the same with the front free end of one of the brake wings, selectively releasable means for normally holding the drums against movement, a central controlling shaft, a plurality of idlers mounted for movement toward and from the central controlling shaft and arranged each to operatively connect said shaft with one of the drums, and means for holding said idlers in their outer or their inner positions.

In testimony whereof I affix my signature.

THOMAS B. SMITH. [L. S.]